2,934,742

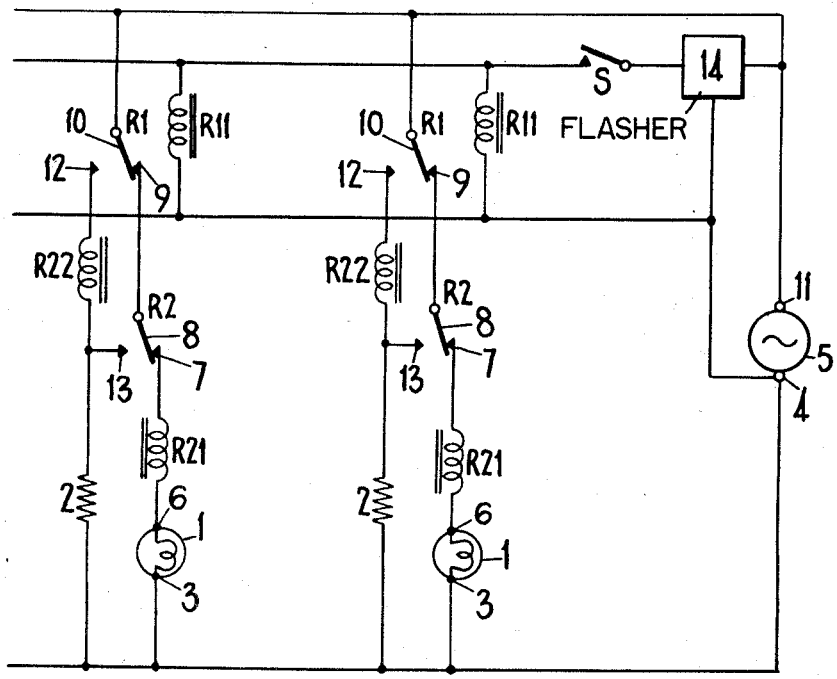

ELECTRIC CIRCUIT ARRANGEMENTS COMPRISING ONE OR MORE PRIMARY LOADS AND ONE OR MORE SECONDARY LOADS

Norman Hugh Tyrwhitt, Watford, and Charles Edington Williams, Stanmore, England, assignors to The General Electric Company Limited, London, England Application November 27, 1957, Serial No. 699,303

Claims priority, application Great Britain November 27, 1956

7 Claims. (Cl. 340—25)

This invention relates to electric circuit arrangements of the kind comprising one or more primary load circuits, and one or more secondary load circuits each arranged for connection in substitution for a corresponding primary load circuit by the operation of switching means.

The invention is particularly, though not exclusively, concerned with arrangements of the above kind having a plurality of primary load circuits connected in parallel with each other between the circuit input terminals and each including or arranged to include in use of the arrangement a primary load in the form of one or more electric lamps arranged to be flashed intermittently by the operation of the switching means, and wherein the secondary loads are arranged to be connected in circuit by the switching means when the lamps are switched off, so as to maintain the total load in the supply substantially constant.

Such arrangements are often employed, for example, in aerodrome identification beacon systems, the impedance of the secondary loads in normal operation of the arrangement being such that the total load presented to the supply is substantially the same whether the lamps are switched on or off. In this way any appreciable fluctuation of the current drawn from the supply is substantially avoided. This is desirable since in many cases aerodrome identification beacon arrangements of the above kind are supplied with current by means of small individual motor-driven alternators, and an appreciable variation of the load in such an arrangement may give rise to excessive wear of parts of the motor or alternator.

However should a lamp become open circuited in an arrangement of this kind a variation in input current as the secondary load circuit is substituted for and replaced by, the lamp load circuit will result, and in addition to any effects of wear produced on the motor or alternator this might give rise to a variation in the voltage across the remaining lamps and a fluctuation in the supply frequency, which might be undesirable.

Similarly in other forms of circuit arrangement of the kind referred to the open circuiting of a said primary load circuit may produce an undesirable variation in the total load presented to the supply during the operation of the switching means, and the object of the present invention is to provide means for reducing this difficulty in such circuits.

According to the invention in an electric circuit arrangement of the kind referred to at least one primary load circuit is connected between the circuit input terminals in series with a first set of contacts of said switching means, and the corresponding secondary load circuit is connected between the circuit input terminals in series with a second set of contacts of said switching means, the means for operating the two sets of contacts are so linked that the opening of either one set results in the closure of the other, and the arrangement includes an electromagnetic relay having a first operating coil connected so as to be in series with the primary load but not the secondary load, a second operating coil connected so as to be in series with the secondary load but not the primary load, and a pair of contacts which are arranged to open when the relay is energised by current through either operating coil, in operation of the arrangement, the relay contacts being connected between the two load circuits so as to be included, in operation of the arrangement, in a series circuit between the input terminals which contains the first set of contacts and said secondary load, but not the relay coils or the second set of contacts or said primary load.

In such an arrangement the relay contacts of the said relay will remain open in normal operation so that current will flow through either the primary load or the secondary load on the closure of the first set or the second set of contacts respectively by the switching means.

However on a failure of the primary load which breaks the current path through the primary load circuit, the de-energisation of the relay when the first set of contacts of the switching means closes, results in the establishment of a further current path through the closed relay contacts and the secondary load. Since the second operating coil of the relay is by-passed the relay contacts remain closed until the switching means is operated to open the first set of contacts and close the second set of contacts, the circuit between the input terminals then being completed through the second operating coil of the relay and the secondary load in the usual manner.

In this way, a current path through the secondary load is established on the closure of either set of contacts of the switching means despite the open circuit failure of the primary load, and the total load presented to the supply can thereby be maintained substantially constant whatever the condition of the switching means, and where the arrangement is supplied with current from a small individual generator, variations in the output voltage and other detrimental effects which might be caused by load variation are reduced. Where the arrangement comprises a plurality of primary load circuits connected in parallel with each other between the circuit input terminals, preferably each primary load circuit is connected in series with a said first set of contacts of said switching means, the associated secondary load circuit is connected in series with a said second set of contacts of said switching means, and a separate said electromagnetic relay having its operating coils and contacts connected as aforesaid is provided for each primary load circuit and associated secondary load circuit.

All the primary load circuits may share common contacts of said switching means although preferably a different pair of contacts is connected in series with each primary load circuit. Similarly each secondary load circuit may be connected in series with individual contacts of said switching means or contacts which are common to all the secondary load circuits.

Where separate contacts are provided for each primary load circuit and each secondary load circuit these are preferably arranged to be actuated simultaneously. For example, the switching means itself may conveniently be provided by an electromagnetic relay having contacts for each primary and secondary load circuit, which contacts are arranged to be closed or opened as appropriate on the energisation of the relay. Alternatively the switching means may comprise a number of electromagnetic relays each associated with a primary load circuit and its corresponding secondary load circuit, the operating coils of which relays are connected in operation of the arrangement to a supply of electric current through a common switch.

Each primary load may comprise one or more incandescent filament lamps or one or a number of series-connected discharge lamps together with a ballast impedance, the invention being particularly applicable to arrangements of this kind in which the lamps are required to be flashed intermittently, for example signalling systems and the like. It will, however, be appreciated that the invention is also applicable to circuit arrangements including other forms of primary loads liable to become open circuited in use where it is desired to maintain the overall load presented to the supply substantially constant despite the failure of a primary load.

By the choice of suitable electromagnetic relays the invention may be employed in circuit arrangements of the kind referred to designed for operation on either alternating current or direct current supplies.

In order to prevent excessive operation of the relay contacts during normal use of the arrangement the inertia of the relay armature is preferably arranged to be sufficiently great to ensure that the contacts are held open during the changing-over of the switching means from the primary load circuit to the secondary load circuit and vice versa.

In order to explain the invention more fully a circuit arrangement for repeatedly flashing a plurality of electric incandescent filament lamps, and including means in accordance with the invention for maintaining a substantially constant load in the event of failure of one or more of the lamps, will now be described by way of example with reference to the accompanying drawing.

This arrangement comprises a plurality of primary load circuits, only two of which are shown, each including a tungsten filament lamp 1, providing the primary load and a corresponding number of secondary load circuits each associated with one of the primary circuits and including a resistor 2 providing the secondary load.

One lamp terminal 3 is connected to a supply terminal 4 of an electric alternator 5, the other lamp terminal 6 being connected through an operating coil R21 of a two-coil electromagnetic relay R2 to the fixed contact 7 of the relay, the movable contact 8 of which is connected to the fixed contact 9 of a further relay R1 whose movable contact 10 is connected to the other terminal 11 of the alternator 5.

One end of the resistor 2 is also connected directly to the supply terminal 4 of the alternator 5 and to one end of the second operating coil R22 of the relay R2, the other end of which coil is connected to a second fixed contact 12 of the relay R1. The junction of the resistor 2 and the operating coil R22 is connected to the second fixed contact 13 of the relay R2.

The operating coil R11 of the relay R1 is connected at one end to the supply terminal 4 of the alternator 5 and at the other end to the second supply terminal 11 of the alternator through a switch S. The switch S is operated intermittently by means of a control circuit 14 for intermittently energising the relay R1 so as to cause the lamps 1 of the arrangement to flash on and off at a rate dependent on the control circuit. The control circuit 14 and switch S are common to all the relays R1, the operating coils R11 of these relays being in parallel with each other and all in series which the switch S. The construction of the control circuit 14 itself is not relevant to the present invention and may be of any known kind suitable for flashing the lamps in the manner required.

In the unenergised condition of the relay R1 the movable contact 10 is arranged to engage the fixed contact 9, the movable contact 8 of the relay R2 being arranged to engage the fixed contact 13 in the unenergised condition of this latter relay.

On first switching on the arrangement the closure of the switch S causes the movable contact 10 of each relay R1 to engage the corresponding fixed contact 12 causing current to flow through the resistor 2 in the corresponding load circuit and the series connected operating coil R22 of the relay R2. This results in the energisation of this latter relay but the corresponding lamp is not energised since the circuit through the primary load circuit is broken at the relay R1. The opening of the switch S and the corresponding de-energisation of the relays R1 causes the movable contact 10 of these latter relays to engage the fixed contacts 9 so completing the corresponding primary circuits and causing the lamps 1 to light. Each of the second relays R2 is held in the energised condition by current through the respective operating coil R21 the armature of the relays R2 being arranged to have a large moment of inertia so that the respective contacts 7, 8 are held in engagement with each other during the short interval in which the movable contacts 10 of the relays R1 are changing over from contacts 9 to contacts 12 or from contacts 12 to contacts 9 as the lamps are switched from the "on" to the "off" condition and vice versa.

The resistance of the resistor 2 is such that during the "off" periods of the lamps 1, in normal operation of the arrangement, the value of the input current is substantially the same as it is when the lamps are alight.

In this way a substantially constant load is presented to the alternator during normal operation of the arrangement.

However should a lamp fail, for example due to a broken filament, no current will flow through the corresponding coil R21 of the relay R2 when the movable contact 10 of the relay R1 engages the fixed contact 9. The relay R2 will then return to its unenergised condition with the movable contact 8 held in engagement with the fixed contact 13, thus completing the secondary circuit through the resistor 2.

In this way the load on the alternator is maintained substantially constant, the repeated reduction in load which would otherwise take place owing to the failure of one or more lamps when the lamp circuits are switched on, and the subsequent increase in load when the lamp circuits are switched off, being prevented.

If desired the end of the relay operating coil R21 may be connected directly to the fixed contact 9 of the relay R1, the contact 7 of the relay R2 being left disconnected. The operation of such a circuit will be the same as that illustrated.

We claim:

1. An electric circuit arrangement including at least one primary load circuit each associated with a secondary load circuit, switching means arranged to substitute the secondary load circuit for the primary load circuit, and means for operating the switching means periodically for alternately energizing the primary and secondary load circuits, wherein the primary load circuit is connected between the circuit input terminals in series with a first set of contacts of said switching means, and the corresponding secondary load circuit is connected between the circuit input terminals in series with a second set of contacts of said switching means, the means for operating the two sets of contacts are so linked that the opening of either one set results in the closure of the other, and the arrangement includes an electromagnetic relay having a first operating coil connected so as to be in series with the primary load but not the secondary load, a second operating coil connected so as to be in series with the secondary load but not the primary load, and a pair of contacts which are arranged to open when the relay is energised by the current through either operating coil, in operation of the arrangement, the relay contacts being connected between the two load circuits so as to be included, in operation of the arrangement, in a series circuit between the input terminals which contains the first set of contacts and said secondary load, but not the relay coils or the second set of contacts or said primary load.

2. An electric circuit arrangement according to claim 1 including a plurality of primary load circuits connected in parallel with each other between the circuit input terminals, wherein each primary load circuit is connected in series with a said first set of contacts of said switching means, the associated secondary load circuit is connected in series with a said second set of contacts of said switching means, and a separate said electromagnetic relay is provided for each primary load circuit and associated secondary load circuit.

3. An electric circuit arrangement according to claim 2 wherein the switching means includes a plurality of pairs of contacts each connected in series with a corresponding one of the primary load circuits, and a further plurality of pairs of contacts each connected in series with a corresponding one of the secondary load circuits, and the arrangement includes means for actuating all the pairs of contacts simultaneously.

4. An electric circuit arrangement according to claim 3 wherein the switching means comprises a plurality of electromagnetic relays each having a first pair of contacts in series with a corresponding primary load circuit and a second pair of contacts in series with its associated secondary load circuit, the first and second pairs of contacts being so arranged that when one is open the other is closed, and wherein the operating coils of the relays are connected to terminals, arranged to be connected in use of the arrangement to a supply of electric current, through a common switch.

5. An electric circuit arrangement according to claim 2 wherein each primary load circuit includes at least one electric incandescent-filament lamp.

6. An electric circuit arrangement according to claim 1 wherein each primary load circuit includes at least one electric lamp, and wherein means are provided for actuating the switching means periodically to produce an intermittent flashing of the lamp.

7. An aerodrome identification beacon including an electric circuit arrangement having a plurality of primary load circuits each arranged to contain at least one electric lamp and each associated with a corresponding secondary load circuit, switching means for switching the lamps on and off and arranged to substitute the corresponding secondary load circuit for each primary load circuit during the "off" periods of the lamps, and means for actuating the switching means periodically to produce an intermittent flashing of the lamps, wherein each primary load is connected between the circuit input terminals in series with a first set of contacts of said switching means, and the corresponding secondary load circuit is connected between the circuit input terminals in series with a second set of contacts of said switching means, the means for operating the two sets of contacts are so linked that the opening of either one set results in the closure of the other, and wherein the arrangement includes for each primary load and its associated secondary load, an electromagnetic relay having a first operating coil connected so as to be in series with the primary load but not the secondary load, a second operating coil connected so as to be in series with the secondary load but not the primary load, and a pair of contacts which are arranged to open when the relay is energised by the current through either operating coil, in operation of the arrangement, the relay contacts being connected between the two load circuits so as to be included, in operation of the arrangement, in a series circuit between the input terminals which contains the first set of contacts and said secondary load, but not the relay coils or the second set of contacts or said primary load.

References Cited in the file of this patent
UNITED STATES PATENTS

| | | |
|---|---|---|
| 230,346 | Sawyer | July 20, 1880 |
| 347,025 | Brush | Aug. 10, 1886 |
| 372,942 | Stanley | Nov. 8, 1887 |
| 1,280,914 | Wefel | Oct. 8, 1918 |
| 1,677,193 | McCurdy | July 17, 1928 |